ABSTRACT: This invention is a process for making a cellular polyurethane comprising reacting a polyalkylene polyol having reactive hydrogen atoms as determined by the Zerewitinoff method exhibiting a molecular weight of at least 500, an organic polyisocyanate, and water in the presence of a gel catalyst and a foaming catalyst comprising an antimony compound, a base, and a nitrogen-containing organic compound.

United States Patent

[11] 3,620,985

[72] Inventors William A. Larkin
Morristown;
Kenneth Treadwell, Rahway, both of N.J.
[21] Appl. No. 762,318
[22] Filed Sept. 16, 1968
[45] Patented Nov. 16, 1971
[73] Assignee M & T Chemicals Inc.
New York, N.Y.

[54] URETHANE FOAM CATALYST AND PROCESS FOR PREPARING URETHANE FOAM
11 Claims, No Drawings
[52] U.S. Cl. .................................................. 260/2.5 AC,
252/426, 252/431 C, 260/2.5 AB, 260/18 TN, 260/24
[51] Int. Cl. ....................................................... C08f 47/10
[50] Field of Search ........................................... 260/2.5 AB,
2.5 AC, 77.5 AC; 252/426, 431 C

[56] References Cited
UNITED STATES PATENTS

| | | | |
|---|---|---|---|
| 3,194,773 | 7/1965 | Hostettler....................... | 260/2.5 |
| 3,235,518 | 2/1966 | Hostettler et al. ............. | 260/2.5 |
| 3,245,958 | 4/1966 | Hindersinn et al........... | 260/75 |
| 3,397,158 | 8/1968 | Britain et al................. | 260/2.5 |

FOREIGN PATENTS

| | | | |
|---|---|---|---|
| 891,007 | 3/1962 | Great Britain................ | 260/2.5 |
| 1,333,121 | 7/1963 | France ......................... | 260/2.5 |

*Primary Examiner*—Donald E. Czaja
*Assistant Examiner*—Donald J. Barrack
*Attorneys*—Lewis C. Brown and Kenneth G. Wheeless

URETHANE FOAM CATALYST AND PROCESS FOR PREPARING URETHANE FOAM

This invention relates to polyurethane foams and more specifically to novel blowing catalyst systems and to a method for producing such foams.

It is well known that a polyurethane can be prepared by reacting organic polyfunctional isocyanates with organic compounds having two or more reactive hydrogen atoms as determined by the Zerewitinoff reaction. When this reaction is conducted under anhydrous conditions, the resulting polyurethane may be nonporous. If a cellular or foamed product is desired, water and an excess of isocyanate must be added to the mixture. When water reacts with the excess isocyanate groups not previously reacted, carbon dioxide is formed and entrapped in the reaction mixture. Various materials have been employed as catalysts or activators in the formation of polyurethanes. These catalysts have as their prime function the control of gas forming or blowing reaction.

The preparation of foam from polyurethanes requires a predetermined control of the blowing or gas-forming reaction which liberates the carbon dioxide. It has been found that the desired foam time or rise time should be about 60 to 100 seconds, typically about 70 seconds measured under commercial conditions in environmental temperatures of about 25° C. Although many catalyst systems have been tried, there is no simple commercial system which will permit the production of catalytically formed polyurethane foams.

It is an object of this invention to provide an improved and odorless foam product based on polyurethane. It is a further object of this invention to foam polyurethane in an optimum period of time. Other objects will be apparent to those skilled in the art on the inspection of the following description.

This invention is a process for making cellular polyurethane comprising reacting a polyalkylene polyol having reactive hydrogen atoms as determined by the Zerewitinoff method, an organic polyisocyanate, and water in the presence of a gel catalyst and a blowing catalyst consisting of a mixture of an antimony compound, a base, and a nitrogen-containing organic compound.

The foaming agent system of this invention provides an easily controlled foaming process. The novel synergistic catalyst combination of this invention unexpectedly permits extremely rapid foaming reactions in the production of polyurethane. The novel catalyst system of this invention produces an optimum rise time.

It will apparent that the foaming or blowing (or rise) reaction occurs simultaneously with the gelling (or solidification) reaction. When the gelling time of the reaction mixture is properly balanced with the rise time, the solidifying mass entraps the carbon dioxide gas thereby resulting in a foamed product.

The base component of the novel blowing or foaming or rise catalyst of this invention may form a salt with the nitrogen-containing organic compound or may form a partial half salt with the nitrogen-containing organic compound. The base component of the novel blowing or foaming or rise catalyst may be in a mixture of the nitrogen-containing organic compound and the antimony compound.

The preferred bases are sodium hydroxide and potassium hydroxide. Other basic materials are operable.

The blowing or foaming catalyst of this invention comprises an antimony compound, a base and a nitrogen-containing organic compound. The antimony compound is of the formula $Sb(Y_1)_n$ wherein Y is selected from the group consisting of R, OOCR', O, halogen, OR, SR, OOCRSH, SRCOOR',

wherein R and R' are independently selected from the group consisting of alkyl, alkenyl cycloalkyl, aralkyl, aryl, alkaryl, including such radicals when inertly substituted, and $n$ is selected from integers of 3 and 5. The antimony compounds encompassed by the invention include both trivalent and pentavalent antimony compounds.

The antimony compound may be of the formulas:

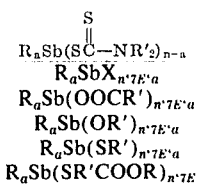

$R_aSb(OOCRSH)_{n\cdot 7E\cdot a}$ wherein $n$ is the valence of antimony, 3 or 5, and $a$ is an integer less than 5 or zero, R and R' are as defined above.

In this compound, R and R' are hydrocarbon radicals preferably selected from the group consisting of alkyl, alkenyl, cycloalkyl, aralkyl, aryl, alkaryl, including such radicals when inertly substituted. Alkyls are typically straight chain alkyl or branched alkyl, including methyl, ethyl, n-propyl, isopropyl, n-butyl, isobutyl, sec-butyl, tert-butyl, N-amyl, neopentyl, isoamyl, n-hexyl, isohexyl, heptyls, octyls, decyls, dodecyls, tetradecyl, octadecyl, etc. Preferred alkyl includes lower alkyl, i.e. having less than about eight carbon atoms, i.e. octyls and lower. Typical alkenyls include vinyl, allyl, 1-propenyl, methallyl, buten-1-yl, buten-2-yl, buten-3-yl, penten-1yl, hexenyl, heptenyl, octenyl, decenyl, dodecenyl, tetradecenyl, octadecenyl, etc. Typical cycloalkyls include cyclopentyl, cyclohexyl, cycloheptyl, cyclooctyl, etc. When R is aralkyl, it may typically be benzyl, β-phenylethyl, Yexample, methyl, β-phenylpropyl, etc. Typical aryls include phenyl, naphthyl, etc. Typical alkaryls include tolyl, xylyl, p-ethylphenyl, p-nonylphenyl, etc. R and R' may be inertly substituted, e.g. may bear a nonreactive substituent such as alkyl, aryl, cycloalkyl, aralkyl, alkaryl, alkenyl, ether, halogen, nitro, ester, etc. Typical substituted alkyls include 3-chloropropyl, 2-ethoxyethyl, carboethoxymethyl, etc. Substituted alkenyls include 4-chlorobutyl, Y-phenylpropenyl, chloroallyl, etc. Substituted cycloalkyls include 4-methylcyclohexyl, 4-chlorocyclohexyl, etc. Inertly substituted aryl includes chlorophenyl, anisyl, biphenyl, etc. –substituted aralkyl includes chlorobenzyl, p-phenylbenzyl, p-methylbenzyl, etc. Inertly substituted alkaryl includes 3-chloro-5-methylphenyl, 2,6-di-tert-butyl-4-chlorophenyl, etc.

The preferred antimony compound in the practice of this invention is an antimony carboxylate.

The anionic component of the antimony carboxylate is expressed in simplest form as $R'''(COO-)_n$ wherein $R'''$ represents a hydrocarbon group, typically an aliphatic or cycloaliphatic group such as alkyl, alkenyl, etc., and corresponding cyclic groups such as cycloalkyl, etc. groups; an aryl group such as phenyl, substituted phenyls, naphthyl, etc.; an aralkyl group such as benzyl, styryl, cinnamyl, etc.; an alkaryl group such as tolyl, xylyl, etc.; a cycloaliphatic group such as a naphthenic group; etc. Other equivalent groups may be employed. Preferably $n$ is 1 and the acid is monobasic. $n$ may be a small whole integer, typically 1, 2, 3, etc. In the preferred embodiment, $R'''$ may be an alkyl group having less than about twenty carbon atoms. Typical of the acids from which the antimony salts may be prepared may be acetic acid, propionic acid, butyric acid, caproic acid, caprylic acid, capric acid, stearic acid, oleic acid, etc. Naphthenic acid may be employed. The commercially occurring mixture of acids known as tall oil fatty acids are preferred in the practice of this invention.

It is preferred that the antimony carboxylate be formed from an amount of acid sufficient to satisfy each of the valence bonds of the antimony metal. The salt which may be used in practice of this invention may be those materials prepared for example by neutralizing a basic compound of the metal, typically the hydroxide or oxide.

Specific antimony compounds operable in the practice of this invention include:
 antimony tritallate
 antimony-2-ethylhexoate
 antimony tristearate
 antimony trilaurate antimony trimyristate
antimony tripalmitate
antimony trioleate
antimony triricinoleate
antimony trinaphthenate
antimony tribenzoate
antimony trisalicylate
antimony triphenoxide
antimony tricresoxide
antimony trixylenoxide
antimony nonylphenoxide
antimony caproate diheptylate
antimony tricaprylate dibromide
antimony tributyrate dibromide
antimony tricinnamates dibromide
antimony trivalerate dibromide
antimony triheptylate dibromide
antimony tricaprate dibromide
tris(2,3-dichloropropyl) antimonite
tris($\beta$-chloroethyl antimonite
tris($\beta$-chlorobutyl) antimonite
tris(2-chloro-2-phenylethyl) antimonite
tris(n-octoxy) (n-octoxy) antimony dibromide
tris(2-ethylhexoxy) antimony dibromide
tribenzoxy antimony dibromide
tris($\beta$-chloroethoxy) antimony dibromide
tris($\beta$-chlorobutoxy) antimony dibromide
phenyl antimony dibromide
tolylantimony dibromide
butylantimony diiodide
benzylantimony dichloride
cyclohexylantimony dibromide
allylantimony diiodide
chlorophenylantimony dichloride
octylantimony dibromide
diphenylantimony acetate
diphenylantimony propionate
diphenylantimony butyrate
ditolylantimony $\alpha$-methylpropionate
dixylylantimony $\alpha$-methylpropionate
di-$\alpha$-naphthylantimony acetate
ditolylantimony butyrate
bis(p-chlorophenyl) antimony Y-chlorobutyrate
diphenylantimony $\beta$-ethoxypropionate
diethylantimony acetate
di-n-propylantimony propionate
di-n-butylantimony $\alpha$-methylpropionate
di-n-octylantimony propionate
dilaurylantimony butyrate
bis(2-ethylhexyl) antimony $\alpha$-methylpropionate
di-n-hexylantimony acetate
diallyantimony acetate
di-2-butenylantimony propionate
dibenzylantimony $\alpha$-methylpropionate
dicyclohexylantimony acetate
diphenylantimony valerate
diphenylantimony caproate
ditolylantimony $\alpha$-methylvalerate
dixylylantimony $\beta$-methylvalerate
diethylantimony $\alpha$-ethylcaproate
di-n-propylantimony caprylate
di-n-butylantimony caprate
di-$\alpha$-naphthylantimony pelargonate
di-n-octylantimony laurate
dilaurylantimony stearate
di-2-ethylhexylantimony oleate
di-n-hexylantimony benzoate
diallylantimony p-toluate
di-2-butenylantimony p-ethylbenzoate
dibenzylantimony $\alpha$-naphthoate
dicyclohexylantimony phenylacetate
diphenylantimony phenoxyacetate
diphenylantimony linoleate
ditolylantimony cyclohexanoate
diphenylantimony tetrachlorobenzoate
diphenylantimony tallate
ditolylantimony rosinate
bis(p-chlorophenyl) antimony pelargonate
diphenylantimony p-chlorobenzoate
diphenylantimony dithiocarbamate
dibutylantimony methyldithiocarbamate
diphenylantimony dimethyldithiocarbamate
ditolylantimony ethyldithiocarbamate
diallylantimony diethyldithiocarbamate
phenylantimony di(n-propyldithiocarbamate)
tolylantimony di(di-n-propyldithiocarbamate)
butylantimony di(isopropyldithiocarbamate)
allylantimony di(di-isopropyldithiocarbamate)
benzylantimony di(butyldithiocarbamate)
cyclohexylantimony di(dibutyldithiocarbamate
chlorophenylantimony di(octyldithiocarbamate)
octylantimony di(dioctyldithiocarbamate)
dibenzylantimony dodecyldithiocarbamate
dichlorophenylantimony didodecyldithiocarbamate
dicyclohexylantimony hexadecyldithiocarbamate
dioctylantimony phenyldithiocarbamate
diphenylantimony diphenyldithiocarbamate
dicyclohexylantimony cyclohexyldithiocarbamate
phenylantimony di(dicyclohexyldithiocarbamate)
tolylantimony di(allyldithiocarbamate)
cyclohexylantimony di(diallyldithiocarbamate)
diphenylantimony benzyldithiocarbamate
dibenzylantimony dibenzyldithiocarbamate
di(diphenylantimony) methylenebisdithiocarbamate
di(ditolylantimony) ethylenebisdithiocarbamate
di(dicyclohexylantimony) propylenebisdithiocarbamate
phenylantimony trimethylenebisdithiocarbamate
tolylantimony tetramethylenebisdithiocarbamate
butylantimony hexamethylenebisdithiocarbamate
allylantimony octamethylenebisdithiocarbamate
benzylantimony o-phenylenebisdithiocarbamate
phenylantimony m-phenylenebisdithiocarbamate
di(diphenylantimony) p-phenylenebisdithiocarbamate
di(ditolylantimony) $\alpha$-tolylenebisdithiocarbamate
chlorophenylantimony xylylenebisdithiocarbamate
di(diphenylantimony) 4,4'-biphenylenebisdithiocarbamate
di(diphenylantimony) 4-chloro-1,2-phenylenebisdithiocarbamate
diphenylantimony dimethylenedithiocarbamate
phenylantimony di(pentamethylenedithiocarbamate)
cyclohexylantimony di(hexamethylenedithiocarbamate)
tolylantimony N,N'-diethyl ethylenebisdithiocarbamate
butylantimony di(N-methyl ethyldithiocarbamate)
allylantimony N,N'-dimethyl hexamethylenebisdithiocarbamate
dichlorophenylantimony N-(3-chloro-2-butenyl)-cyclohexylidithiocarbamate
octylantimony di(N-cyclohexyl amyldithiocarbamate)
antimony S, S', S'' tri(octadecyl thiomaleate)
antimony S,S',S'' tri(dihydroabietyl mercaptoacetate)
antimony S,S', S'' tri(nonylmercaptoacetate)
triphenylantimony S,S' bis(isooctylmercaptoacetate)
tri-n-octylantimony S,S' bis(isooctylmercaptacetate)

The nitrogen-containing compounds operable in the practice of this invention include primary, secondary, and tertiary amino-substituted carboxylic acids, aromatic amino-substituted carboxylic acids, monoamino-mono-carboxylic acids, monoamino-dicarboxylic acids, diamino-mono-carboxylic acids, heterocyclic aminoacids, amidoximes, and hydroxamic acids.

Among the specific amino-substituted carboxylic acids operable in the practice of this invention are the following amino acids: aminoacetic acid, $\alpha$-amino-$\beta$-p-hydroxyphenyl acetic acid, $\alpha$-aminopropionic acid, $\alpha$-aminoisovaleric acid, $\alpha$-aminoisocaproic acid, $\alpha$-amino-$\beta$-methylethyl propionic acid, $\alpha$amino-$\alpha$-methylbutyric acid, $\alpha$-amino-$\beta$-phenylpropionic acid, $\alpha$-amino-$\beta$-parahydroxyphenyl propionic acid, $\alpha$-amino-$\beta$-hydroxypropionic acid, $\alpha$-amino-$\alpha$-$\delta$-hydroxybutyric acid, $\alpha$-amino-delta-guanidine acid, arginine, ornithine, asparagine, citrulline, proline, hydroxyproline, and nitrilotriacetic acid.

Among the amidoximes operable in the practice of this invention are amidoximes of the formula

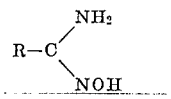

amidoximes of the formula

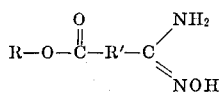

and hydroxamic acids of the formula

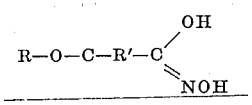

wherein R is a monovalent hydrocarbon radical having three to eighteen carbon atoms and R' is a divalent hydrocarbon radical having one to three carbon atoms, such that the total number of carbon atoms in said structure does not exceed 21.

Thus R can be propyl, isopropyl, butyl, isobutyl, amyl, isoamyl, hexyl, cyclohexyl, 2-ethylhexyl, nonyl, decyl, n-decyl, dodecyl, tridecyl, oleyl, and stearyl; R' is a divalent hydrocarbon substituent having from one to three carbon atoms such as methylene, ethylene, propylene, and isopropylene.

Specific hydroxamic acids, operable in the practice of this invention include: acetohydroxamic acid, butyrohydroxamic acid, butylmercaptoacetohydroxamic acid, p-toluohydroxamic acid, p-amylbenzohydroxamic acid, laurohydroxamic acid, salicylhydroxamic acid, palmitohydroxamic acid, stearohydroxamic acid, oleohydroxamic acid, p-tertiary amylphenoxyacetohydroxamic acid, dodecane-1- mercaptosuccinodihydroxamic acid, N-dibutyl-aminoacetohydroxamic acid and o-methoxybenzohydroxamic acid.

The ratio of antimony compound to base salt of an organic nitrogen-containing compound can be varied from about 0.5 to 2. Generally, substantially equal moieties of antimony carboxylate and alkali metal salt of nitrogen-containing compounds synergize more efficaciously.

The antimony tritallate used in the practice of this invention was prepared by refluxing propionic anhydride and tall oil fatty acids having an acid number of 199, distilling off propionic acid as it was formed to form a mixed anhydride and antimony trioxide was added to a reaction vessel fitted with an agitator and a reflux condenser, heated to reflux temperature which temperature was maintained for 90 minutes. The reaction mixture was then subjected to a pressure of 4 millimeters of mercury and the byproduct propionic anhydride recovered by distillation. The residue was passed through a bed of diatomaceous earth to obtain the product, the antimony salt of tall oil fatty acids.

The amidoximes can be prepared by reaction with corresponding cyanoacetic esters, cyanopropionic esters, or cyanobutyric esters with hydroxyl amine. Hydroxyl amine is obtained by liberation from its salt, e.g. hydroxyl amine hydrochloride with alkali. Generally, 1 mole of the corresponding cyanoacetic ester is reacted for 1 to 6 hours with from 1 to 2 moles of hydroxyl amine at temperatures from about 30° to 70° C. and at a pH from about 7 to 9.

The hydroxamic acid of the present invention can be prepared in several ways. For instance the amidoximes previously described can be hydrolyzed with water at temperatures from −10° to +10° C. in concentrated mineral acids, thereby converting the amidoxime to corresponding hydroxamic acid. A preferred method, however, of preparing hydroxamic acid is to react a dimaloester, a disuccinoester, or a diglucoester with hydroxylamine said esters containing the desired hydrocarbon radicals. Generally, the corresponding diester is reacted in 1 mole of hydroxyl amine for 2-6 hours at a pH from 8 to 11 and from temperatures of 15° to 50° C., thereby forming the desired monohydroxamic acid. In the case of the dimaloester, the desired diester can be easily made by transesterification of the commercially available diethyl-maleate with an alcohol containing the desired higher hydrocarbon radical.

A variety of organic polyisocyanates may be used in the practice of this invention although diisocyanates are preferred in many formulations. Suitable polyfunctional isocyanates include alkylene diisocyanates such as hexamethylene diisocyanates, and decamethylene diisocyanates, tolylene diisocyanates, naphthalene diisocyanates, 4,4'-diphenylmethane diisocyanates, isomers or mixtures of any of these. Triisocyanates typically obtained by reaction with 3 moles of an arylene diisocyanate with 1 mole of a triol, e.g. the 123 products formed from 3 moles of tolylene diisocyanate and 1 mole of hexane triol may be employed. A preferred polyisocyanate is the mixture of 80 percent 2,4-tolylene diisocyanate and 20 percent 2,6-tolylene diisocyanate.

The term "isocyanates" is used herein to refer to polyisocyanates –to polyisothiocyanates, respectively, including particularly diisocyanates and diisothiocyanates. While the invention has been described specifically with reference to the reaction of certain diisocyanates, it is generically applicable to the reaction of any compound containing two or more $-N=C=G$ groups in which G is oxygen or sulfur. Compounds within this generic definition include polyisocyanates and polyisothiocyanates of the general formula.

$R(NCG)_x$ in which $x$ is two or more and R can be alkylene, substituted alkylene, arylene, substituted arylene, a hydrocarbon or substituted hydrocarbon containing one or more aryl-NCG bonds and one or more alkyl-NCG bonds, a hydrocarbon or substituted hydrocarbon containing a plurality of either aryl-NCG or alkyl-NCG bonds. R can also include radicals such as -R-Z-R where Z may be any divalent moiety such as $-O-$, $-O-R-O-$, $-CO-$, $-CO_2-$, $-S-$, $-S-R-S-$, $-SO_2-$hexamethylene diisocyanate, 1,8-diisocyanato-p-methane, xylylene diisocyanates $(OCNCH_2CH_2OCH_2)_2$, 1-methyl-2,4-diisocyanato-cyclohexane, phenylene diisocyanates, tolylene diisocyanates, chlorophenylene diisocyanates, diphenylmethane-4,4'-diisocyanate, naphthalene-1,5diisocyanate triphenyl-methane-4,4', 4''-triisocyanate, xyelen$\alpha,\alpha'$ diisothiocyanate, and isopropylbenzene, 4-diisocyanate.

Further included are dimers and trimers of isocyanates and diisocyanates and polymeric diisocyanates of the general formulas $(RNCG)_x$ and $[R(NCG)_x]_y$ in which $x$ and $y$ are two or more, as well as compounds of the general formula $M(NCG)_x$ in which $x$ is two or more and M is a difunctional or polyfunctional atom or group. Examples of this type include ethylphosphonic diisocyanate, $C_2H_5P(O)(NCO)_2$; phenylphosphonic diisocyanate, $C_6H_5P(NCO)_2$; compounds containing a $\equiv$ Si—NCG group isocyanates derived from sulfonamides $(RSO_2NCO)$, cyanic acid, and thiocyanic acid.

Substances having two or more active hydrogen atoms determined by the Zerewitinoff method operative in the practice of this invention are those organic compounds having 2 or more reactive hydrogen atoms which react with organic polyfuntional isocyanates to give urethane polymers. These polyalkylene polyols, typically exhibiting an average molecular weight of at least about 500, include polyesters, polyethers, polyisocyanate modified polyesters, amides, alkylene glycols, polymercaptans, polyamines, polyisocyanate modified alkylene glycols, etc. These polyalkylene polyols may exhibit active primary or secondary hydroxyl groups. The polyalkylene polyol hydroxy-containing polyethers or polyesters include fatty acid glycerides. Polyesters which are a preferred type of polyalkylene polyol may be obtained by the esterification condensation reaction of aliphatic dibasic carboxylic acid with a glycol or a triol, or mixtures thereof, in proportions such that the resultant polyesters may contain predominately terminal hydroxyl groups. The dibasic carboxylic acids suitable for preparing polyesters include aliphatic and aromatic acids such as adipic acid, fumaric acid, sebasic acid, phthalic acid, etc. Suitable alcohols include ethylene glycols, diethylene glycols, trimethylol propane, etc. The fatty acid glycerides include those having a hydroxyl number of at least 50, such as castor oil, hydrogenated castor oil or blown natural oils.

Polyethers, a preferred type of polyalkylene polyol, include polyalkylene glycols, e.g. polyethylene glycols and polypropolyne glycols, preferably having a molecular weight of at least 200.

The method of this invention is particularly suitable for the reaction of organic polyisocyanates with high molecular weight polymers having at least two end groups containing reactive hydrogen. Preferred class of such polymers includes polyoxyalkylene polyols. These are long chain polyols containing one or more chains of connected oxyalkylene groups. Most desirable, these polyoxyalkylene polyols are liquid having an average molecular weight in the range of 500 to 5,000.

Examples of these polyoxyalkylene polyols include polypropylene glycols having average molecular weights of 500 to 5,000 and reaction products of propylene oxide with linear diols and higher polyols, said higher polyols when employed as reactants giving rise to branched polyoxyalkylene polyols; and ethylene oxide, propylene oxide copolymers having average molecular weights of 500 to 5,000 in which the weight ratio of ethylene oxide to propylene oxide ranges between 10:90 and 90:10, including reaction products mixtures of ethylene oxide and propylene oxide in the said ratios with linear diols and higher polyols.

Examples of linear diols referred to as reactants with one or more alkylene oxides include ethylene glycol, propylene glycol, 2-ethylhexanediol-1,3 and examples of higher polyols including glycerol, trimethylol propane, 1,2,6-hexane triol, pentaerythritol and sorbitol.

Another class of polymers having terminal groups that contain reactive hydrogen atoms suitable for reaction with polyisocyanates are lactone polymers, preferably those exhibiting molecular weights within the range of 500 to 10,000.

The preparation of polyether based urethane foams can be carried out by forming a prepolymer, i.e. prereacting molar equivalents of the polyether and isocyanate in the absence of water and thereafter producing a foam by the addition of excess isocyanate, water, and the novel catalyst combination of this invention. The production of urethane foams may be carried out by the one-shot method in which the polyether, novel blowing agent combination, and isocyanate reactants are simultaneously mixed together and allowed to react in the presence of water. Urethane foams may also be produced by the semiprepolymer technique in which the polyether reactant is partially extended with excess isocyanate to provide a reaction product containing a high percentage of free isocyanate groups (20–35 percent) which is then formed in a later stage by reaction with the additional polyether and the novel blowing catalyst of this invention.

Formation of the preferred foamed products of this invention in a one-shot system is effected by reacting the polyol with excess polyfunctional isocyanate in the presence of water and the novel blowing catalyst of this invention.

Cell modifying agents, e.g. silicones such as trimethyl endblocked dimethyl polysiloxanes may also be used in the practice of this invention.

The polyfunctional isocyanate is typically present in an amount of 5 to 300 percent, e.g. 40 percent by weight of the polyol. Water should be present in an amount sufficient to react with the isocyanate to liberate sufficient gas to produce a foam of the desired physical characteristics. Approximately 1 to 10 percent water, based upon the weight of the polyols, is operable. The mixing of the constituents may be carried out at elevated temperatures or at room temperatures.

In a typical 2-step operation the polyols may be reacted with excess polyfunctional isocyanate in the absence of water initially. Subsequently, water and other agents are added to the mixture, i.e. it is possible to prepare a prepolymer by the reaction of the organic polyisocyanate and the organic compound containing at least two active hydrogen-containing groups in a first step and then reacting the resulting isocyanate determined prepolymer with water in the second step in the presence of the novel foaming catalyst of this invention to prepare a cellular polyurethane plastic.

The amount of isocyanate used in the preparation of flexible foams should be such that there is more than the theoretical amount required to form a urethane linkage, $-NCHO-O-$, in the polymer resulting from reaction with the isocyanate with the active hydrogens of the polyether. The amount of isocyanate employed generally ranges from 1 to 7 equivalents preferably 2 to 6 equivalents, per equivalent of polyether.

The reaction of excess diisocyanate with a polyoxypropylene glycol produces a polymer having terminal isocyanate groups. When it is desired to form a foam, the mixture of the isocyanate-modified polyether reacts through the isocyanate groups with a chain-extending agent containing active hydrogen such as water. This involves several reactions that proceed simultaneously including the reaction between the isocyanate groups and water to form urylene links ($-NH-CONH-$) and carbon dioxide, as well as the reaction of the urylene links so formed with unreacted isocyanate groups to form biuret cross links. Depending upon the desired density of the urethane foam and the amount of cross linking desired, the total isocyanate equivalent to the active hydrogen equivalent should be such as to provide a ratio of 0.8 to 1.2 equivalents of isocyanate per equivalent of active hydrogen, and preferably a ratio of about 0.9 to 1.1 equivalents.

It is a feature of this invention that the synergistic blowing catalyst combination herein noted may be used in connection with a wide variety of gel catalysts including for example stannous 2-ethylhexoate, etc. In practice of the preferred embodiment of this invention, the preferred gelation catalyst which may be employed may be selected from the group consisting of $Sn(OCOR)_2$ and $R'_a SnX_b$. Other equivalent gelation catalysts may be employed. In the stannous compounds, $Sn(OCOR)_2$, R may be a hydrocarbon residue typically alkyl, alkenyl, aryl, aralkyl, alkaryl, cycloalkyl, etc. R may, for example, be methyl, ethyl, propyl, isopropyl, n-butyl, isobutyl, t-butyl, amyl, hexyl, heptyl, octyl, nonyl, decyl, undecyl, oleyl i.e. 7-heptadecenyl, etc., phenyl, o-, m-, or p-tolyl, naphthyl, cyclohexyl, benzyl, etc. The nature of R will, of course, define the group –OCOR; when R is methyl, for example, this group may be the acetate group. Preferably, however, the R group will contain at least about 7 carbon atoms and less than about 17 carbon atoms. When R is heptyl, the group –OCOR may be the 2-ethylhexoate group; when R is 7-heptadecenyl, the group –OCOR is the oleate group, etc. The preferred compounds which may be employed is stannous 2-ethylhexoate and stannous oleate.

In the organotin compounds $R'_a SnX_b$, R' may be the same as R. Preferably R' will be a hydrocarbon residue, typically alkyl, alkenyl, aryl, alkaryl, aralkyl, cycloalkyl, etc. R' may be, for example, methyl, ethyl, propyl, isopropyl, n-butyl, isobutyl, t-butyl, amyl, hexyl, heptyl, octyl, nonyl, decyl, undecyl, oleyl, i.e. 7-heptadecenyl, etc., phenyl, o-, m-, or p-tolyl, naphthyl, cyclohexyl, benzyl, etc. The sum of $a$ and $b$ will be 4, and either of $a$ and $b$ may be 1, 2, and 3. The preferred R' group is the n-butyl group $C_4H_9-$.

In the organotin compounds $R'_a SnX_b$, X may be selected from the group consisting of chlorides and the negative residual portions of organic carboxylic acids RCOO–, mercaptides RS–, alcohols RO–, esters of mercaptoacids $ROOC(CH_2)_n$ wherein R may be hydrogen or the other residues hereinbefore noted; etc. Typical specific residual portions may include the 2-ethylhexoate, the lauryl mercaptide, the methoxide, and the isooctyl thioglycolate.

The preferred organotin compounds $R'_a SnX_b$ may be those wherein $a$ and $b$ are 2; e.g. dibutyltin dilaurate and dibutyltin di-2-ethylhexoate.

In the practice of this invention, the gel catalyst and the novel blowing catalyst combination may be present in ratio of 0.01 to 5 parts, say 1 part of the former per part of the latter. In one preferred embodiment, when the blowing catalyst combination of this invention is used with stannous 2-ethylhexoate as the gel catalyst, the ratio will be approximately 1.

Preferably the catalyst mixture will be present in catalytic amount corresponding to 0.01 to 5, say 0.6 parts by weight per 100 parts of polyol. Preferably, the blowing catalyst will be present in a catalytic amount corresponding to 0.005 to 4.95, say 0.3 parts by weight per 100 parts of polyol, and the gel catalyst will be present in catalytic amount corresponding to 0.005 to 4.2 parts, say 0.3 parts by weight per 100 parts of polyol.

Practice of this invention according to its specific embodiments may be observed by forming a typical one-shot polyether flexible foam by mixing (a) 200 grams of polyalkylene polyol (the polyether triol formed as the condensation product between glycerine and propylene oxide, having a molecular weight of about 3,000, a hydroxyl number of about 56, and sold either under the trademark Niax Triol LG–56 by Union Carbide Chemical Co., or GP–3030 by Wyandotte Chemical Co.); (b) 3.0 grams of cell modifying agent, silicone (Union Carbide Chemical Co. L–520 brand of trimethyl endblocked dimethyl polysiloxane); (c) 90.0 grams of tolylene diisocyanate (80 percent: 20 percent ratio of 2,4- and 2,6- isomers); (d) 7.0 grams of demineralized water; (e) 0.3 grams (except as otherwise indicated) of the foaming or blowing catalyst combination; and (f) 0.4 grams (except as otherwise indicated) of the gel catalyst. Table I infra discloses various specific examples using the combinations of catalysts noted, wherein stannous 2ethylhexoate is used as gel catalyst. Thus, in example 1 set forth in table I, the reaction mixture includes polyol silicone, diisocyanate, and water, together with 0.4 grams of stannous 2-ethylhexoate gelation catalyst, and 0.3 grams of the blowing catalyst combination of antimony tritallate and the potassium salt of norleucine.

The novel blowing catalyst combination of example 1 was prepared by forming a slurry of 2.0 grams of norleucine, α-amino-caproic acid, in 10.0 grams of glycerine. 2.3 grams of a 33 percent solution of potassium hydroxide in methanol was added to the slurry. 4.0 grams of the potassium salt of norleucine thus prepared were mixed with 6.0 grams of antimony tritallate. 0.3 grams of the combination were added to the foregoing formulation.

In each of the examples, all of the components of the formulation were vigorously stirred upon mixing. THe reaction started substantially immediately as evidenced by foaming. The cellular polyurethane product foamed and gelled promptly. The rise time was noted as the time at which the foam has risen to its maximum height. The exotherm was measured by placing a thermometer in the foam and noting the highest temperature to which it rose. Immediately after the mass had foamed, the surface was scraped with a spatula this was done at 5 second intervals. The gel time was that time when, after scraping, the material did not flow or knit back together. The gel and rise times obtained by these tests are readily correlatable with those obtained in commercial practice. The results are tabulated in table I.

TABLE I

| Example No | Foaming Catalyst | Weight (percentage) | Rise Time (seconds) |
|---|---|---|---|
| 1 | Potassium salt of Norleucine | 40 | 71.4 |
|   | Antimony tritallate | 60 | |
| 2 | Sodium salt of Nitrilotriacetic acid | 50 | 63.2 |
|   | Antimony tritallate | 50 | |
| 3 | Potassium salt of Glycine(amino-acetic acid) | 40 | 78.5 |
|   | Antimony tritallate | 60 | |
| 4 | Potassium salt of Anthranilic acid (O-aminobenzoic acid) | 40 | 94.0 |
|   | Antimony tritallate | 60 | |
| 5 | Potassium salt of Nopchelate OS | 40 | 75.0 |
|   | Antimony tritallate | 60 | |
| 6 | Potassium salt of Nopchelate OS | 50 | 65.0 |
|   | Antimony tritaldate | 50 | |

*Nopchelate OS (sold by Nopco Chemical Company, Newark New Jersey) comprises nitrogen-containing organic acids having the formula $C_x H_y O_x N$ wherein $x$ ranges from 10 to 18 and $y$ ranges from 21 to 37 and alkali metal salts of said acids. "Nopchelate OS" exhibits a molecular weight of approximately 270, a specific gravity of 1.0, 6.75% potassium (equivalent), approximately 2.1% nitrogen, 80% solids, 20% xylene, and is a solution of alkyl amido oximes in xylene. More completed description is found in U.S. Pat. Nos. 3,088,798; 3,088,799; and 3,345,344.

Stannous 2-ethylhexoate and stannous oleate are typical of the gelling catalysts which may commonly be made by neutralizing an aqueous solution of a stannous salt with a soap of the desired acid, RCOOH: typically an aqueous solution of stannous chloride may be reacted with a solution of sodium octoate to give the compound stannous octoate, a typical example of materials commonly believed to have the formula $Sn(OCOR)_2$.

Similarly, selected reactions were run using other polyols, e.g. specifically a polyester of adipic acid a geycal adipate, having a hydroxyl number of 52 and acid number of 1.7 a viscosity of 19,500 cps., a specific gravity of 1.19, and a color index of 2.0 on the Gardmer scale, sold under the trademark Foamerez-50 by Witco Chemical Co. The product foams were comparable to those noted in the above table I Comparative polyurethane foams were prepared using only the nitrogen-containing organic compounds as blowing or foaming catalysts. The procedure of preparing the foams of examples 7 through 12 was identical with that followed in preparing the foams of examples 1 through 6. The results are set forth in table II.

TABLE II

Rise time using Nitrogen-containing compound alone as catalyst

| Example No. | Foaming Catalyst | Rise Time (seconds) |
|---|---|---|
| 7 | Norleucine | 270 |
| 8 | Nitrilotriacetric acid | 207.7 |
| 9 | Glycine | 270 |
| 10 | Anthranilic acid | 169.9 |
| 11 | Nopchelate OS | 125.0 |
| 12 | Antimony tritallate | 125.0 |

Further comparative polyurethane foams were prepared using two of the components of the blowing catalyst of examples 1 through 6 but omitting the base The procedure in preparing the foams of examples 13 through 16 was identical with that followed in preparing the foams of examples 1 through 6. The only change was in the omission of the base from the blowing catalyst mixture. The results are set forth in table III.

TABLE III

Rise time omitting the base from the catalyst

| Example No. | Foaming Catalyst | Weight (Percentage) | Rise time (Seconds) |
|---|---|---|---|
| 13 | Norleucine | 40 | |
| | Antimony tritallate | 60 | 145.7 |
| 14 | Nitrilotriacetic acid | 50 | |
| | Antimony tritallate | 50 | 112.0 |
| 15 | Glycine | 40 | |
| | Antimony tritallate | 60 | 155.6 |
| 16 | Anthranilic acid | 40 | |
| | Antimony tritallate | 60 | 180.0 |

TABLE IV

Summary of Comparisons

| Foaming catalyst of the invention | | Nitrogen containing compound alone | | Base omitted from catalyst | |
|---|---|---|---|---|---|
| Ex. No. | (rise time) | Ex. No. | (rise time) | Ex. No. | (rise time) |
| 1 | 71.4 | 7 | 270 | 12 | 145.7 |
| 2 | 63.2 | 8 | 207.7 | 13 | 112.0 |
| 3 | 78.6 | 9 | 270 | 14 | 155.6 |
| 4 | 94.0 | 10 | 169.9 | 15 | 180.0 |
| 5 | 75.0 | 11 | 125.0 | | |

It may be observed from the results tabulated in the foregoing tables that the components of the blowing or foaming catalysts of this invention react synergistically to effect a rise time that is a small fraction of that effected by the individual components alone. It was attempted to use a combination of norleucine and potassium hydroxide (omitting the antimony compound as a foaming catalyst in a procedure identical with that of the foregoing examples. The foam did not rise to full height and subsequently collapsed. A still further comparative example (not tabulated) was run.

It was observed that using antimony tritallate alone as the blowing catalyst in the foregoing formulation (see example 12) resulted in a rise time of 125.0 seconds. In example 9, the gel catalyst of the previous examples, stannous 2-ethylhexoate, was used and glycine alone was used as the blowing catalyst. The rise time again was in excess of 270 seconds. Thus, it may be seen that the individual components of the synergistic blowing catalyst combination of this invention do not function independently in any degree approaching the efficacy of their combination. By the use of the novel catalysts of this invention it is readily possible to vary the gel and foaming times independently, so that the optimum value for each is readily attained. Comparison of examples 7 through 16 with examples 1 through 6 indicates that by synergistic effect, it is possible to obtain substantially decreased rise times by use of the novel catalyst mixture of this invention.

The product foams of this invention may be characterized by outstanding physical properties and hand, a fact which is at least in part due to the excellent balance which may be obtained in the competing gelling and foaming reactions. In addition, because of the surprisingly high efficiency of the diorganotin mixed ester catalysts, the foams may contain lower amounts of catalyst residues. Dry heat stability and aging properties may be superior to prior art foams. Accordingly, the foams of this invention may possess a uniquely wide area of utility.

Practice of this novel invention and the surprising advantages realized thereby may be observed from the following comparative examples.

EXAMPLE 17

Further polyurethane foams were prepared according to the following composition:

| Component | Parts |
|---|---|
| Polyether* | 100.0 |
| Silicone** | 1.5 |
| Water | 3.5 |
| Foaming catalyst | as indicated |
| Stannous octoate | 0.2 or 0.3 |
| Tolylene diisocyanate (80%:20% ratio of 2,4 and 2,6 isomers) | 45.0 |
| organotin gel catalyst | as indicated |

*polyether triol of glycerine and propylene oxide, having a molecular weight of about 3,000, a hydroxyl number of about 56, and sold under the trademark Niax Triol LG-56.
**trimethylol end-blocked dimethyl polysiloxane sold under the trademark Union Carbide L-520.

In each case, the polyether and polyisocyanate were preheated to 30° C. and all of the components were mixed simultaneously. The mixtures were allowed to react without external heating. Rise time, i.e. the time required for the foam to reach its maximum height, was observed and recorded. Gel time, i.e. the time required for the mixture to become nonflowable, was also noted.

The first catalyst employed for purposes of comparison was triphenyl antimony S.S' bis(isooctyl-mercaptoacetate) foam catalyst. In accordance with commercial practice, the triphenylantimony S, S' bis (isooctylmercaptoacetate) was used in the amount of 0.15 parts by weight.

In the second foam prepartation, the novel blowing catalyst used was prepared by mixing 6.0 grams of triphenylantimony S, S' bis (isooctylmercaptoacetate) and 4.0 grams of Nopchelate OS (containing 4percent potassium) in accordance with the practice of this invention The results of these two comparative experiments are shown in table V.

TABLE V

| Foaming Catalyst Employed | parts by weight | Rise Time (Seconds) |
|---|---|---|
| Triphenylantimony S, S' bis(isooctylmercaptoacetate | 0.15 | 270.2 |
| Potassium Hydroxide Nopchelate OS Triphenylantimony S, S' bis (isooctylmercaptoacetate) | 0.3 | 139.0 |

Still further comparative examples were prepared using the procedure of example 17 and are set forth in table VI.

TABLE VI

| Foaming Catalyst Employed | Parts by weight | Rise Time (seconds) |
|---|---|---|
| Diphenylantimony 2-ethylhexoate | 0.3 | 130.6 |
| 40% Nopchelate OS containing 4% potassium 60% Diphenylantimony 2-ethylhexoate | 0.3 | 79.1 |

From tables V and VI it may be been that the novel catalyst combination of this invention is much more efficient than any of the components employed separately as catalysts. Furthermore, the foam prepared in accordance with this invention had outstanding physical characteristics, including freedom from splitting and closed cells. Similar results may be obtained when organotin mixed ester catalysts of this invention are employed.

The novel catalytic compositions of this invention which are suitable for use as blowing and gel catalysts in the production of polyurethane foams by the reaction of a substance having active hydrogen atoms as determined by the Zerewitinoff method, e.g. a polvalkylene polyol, water, and an organic polyfunctional isocvanate may contain a gel catalyst and, as a blowing catalyst, a combination of an antimonv compound, a base, and a nitrogen-containing organic compound. These novel compositions are odor-free, complete catalysts for polyurethane production. The novel polyurethane foams obtained by the process of this invention find a wider variety of uses than polyurethanes heretofore known.

The novel cellular polyurethane compositions prepared in accordance with this invention comprise a cellular polyurethane containing a gelling agent and as a synergistic blowing agent combination 0.004—4.5 parts by weight per 100 parts of polyurethane composition of an antimony compound, a base, a nitrogen-containing organic compound. This novel cellular polyurethane composition may be readily formed into shaped cellular polyurethane objects which may find use in the fabrication of cushions, insulation, and in other areas where cellular polyurethane compositions have heretofore been employed.

Although this invention has been described with reference to specific examples, it will be apparent that various modifications may be made thereto which fall within the scope of this invention.

We claim:

1. The process of making a cellular polyurethane which comprises reacting 100 parts of a substance having active hydrogen atoms as determined by the Zerewitinoff method, 5–300 parts, by weight, of an organic poly-functional isocyanate, 0.5–10 parts, by weight, of water, 0.005–4.2 parts, by weight, of a gel catalyst selected from the group consisting of Sn(OCOR)$_2$ and R'$_a$SNX$_b$ wherein R and R' are independently selected from the group consisting of alkyl, alkenyl, aryl, aralkyl, alkaryl, and cycloalkyl, $a$ and $b$ are integers, the sum of $a$ and $b$ is 4 and X is selected from the group consisting of chlorides and the negative residual portions of organic carboxylic acids, mercaptides, alcohols, esters of mercaptoacids, and as a blowing catalyst combination 0.005 to 4.95 parts, by weight, of a mixture consisting of 40 percent to 60 percent, by weight of an antimony carboxylate and 60 percent to 40 percent, by weight of a sodium or potassium salt of a nitrogen-containing compound selected from the group consisting of primary, secondary, and tertiary amino-substituted carboxylic acids, aromatic amino-substituted carboxylic acids, monoamino-mono-carboxylic acids, monoamino-dicarboxylic acids, diamino-mono-carboxylic acids, heterocyclic aminoacids, amidoximes, and hydroxamic acids, said gel catalyst and blowing catalyst combination being present in the weight ratio of 0.01 parts to 5 parts of the former per part of the latter.

2. The process of making a cellular polyurethane as claimed in claim 1 wherein said nitrogen-containing organic compound is an amino-substituted carboxylic acid.

3. The process of making a cellular polyurethane as claimed in claim 1 wherein said nitrogen-containing organic compound is an amidoxime of the formula

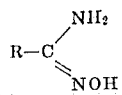

wherein R is a monovalent hydrocarbon radical having three to eighteen carbon atoms.

4. The process of making a cellular polyurethane as claimed in claim 1 wherein said nitrogen-containing organic compound is an amidoxime of the formula

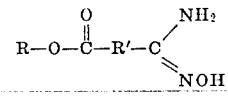

wherein R is a monovalent hydrocarbon radical having three to 18 carbon atoms and R' is a divalent hydrocarbon radical having one to three carbon atoms, such that the total number of carbon atoms in said structure does not exceed 21.

5. The process of making a cellular polyurethane as claimed in claim 1 wherein said nitrogen-containing organic compound is a hydroxamic acid of the formula

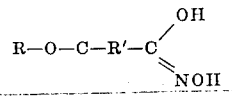

wherein R is a monovalent hydrocarbon radical having three to 18 carbon atoms and R' is a divalent hydrocarbon radical having one to three carbon atoms such that the total number of carbon atoms in said structure does not exceed 21.

6. The process of making a cellular polyurethane as claimed in claim 1 wherein said antimony compound is antimony tritallate.

7. The process of making a cellular polyurethane which comprises reacting 100 parts, by weight, of a substance having active hydrogen atoms as determined by the Zerewitinoff method, 5–300 parts, by weight of an organic polyfunctional isocyanate, 0.5–10 parts, by weight, of water, 0.005–4.2 parts, by weight, or stannous octoate gel catalyst, and as a blowing catalyst combination 0.005 to 4.95 parts, by weight, of a mixture of 40 percent to 60 percent, by weight, of an antimony carboxylate and 60 percent to 40 percent, by weight, of a sodium or potassium salt of a nitrogen-containing organic compound selected from the group consisting of primary, secondary and tertiary amino-substituted carboxylic acids, aromatic amino-substituted carboxylic acids, monoamino-mono-carboxylic acids monoamino-dicarboxylic acids diamino-mono-carboxylic acids, heterocyclic aminoacids, amidoximes, and hydroxami acids, said gel catalyst and blowing catalyst combination being present in the weight ratio of 0.01 parts to 5 parts of the former per part of the latter.

3. The process of making cellular polyurethane which comprises reacting a substance having active hydrogen atoms as determined by the Zerewithinoff method, an organic polyfunctional isocyanate, and water, said reaction being carried out in the presence of 0.005 to 4.2 parts, by weight, of a gel catalyst selected from the group consisting of Sn(OCOR)$_2$ and R'$_a$SNX$_b$ wherein R and R' are independently selected from the group consisting of alkyl, alkenyl, aryl, aralkyl, alkaryl and cycloalkyl, $a$ and $b$ are integers the sum of which is 4 and X is selected from the group consisting of chlorides and the negative residual portions of organic carboxylic acids, mercaptides, alcohols, esters of mercaptoacids, and as a blowing catalyst combination 0.005–4.95 parts, by weight, of a mixture of 40 percent to 60 percent, by weight, of an antimony carboxylate and 60 percent to 40 percent, by weight, of a sodium or potassium salt of a nitrogen-containing organic compound selected from the group consisting of primary, secondary, and tertiary amino-substituted carboxylic acids, aromatic amino-substituted carboxylic acids, monoamino-mono-carboxylic acids, monoamino-dicarboxylic acids, diamino-mono-carboxylic acids, heterocyclic aminoacids, amidoximes, and hydroxamic acids, said gel catalyst and blowing catalyst combination being present in the weight ratio of 0.01 parts to 5 parts of the former per part of the latter.

9. A novel composition suitable for use as a blowing and gel catalyst in the production of polyurethane foams by the reaction of an organic compound having reactive hydrogen atoms as determined by the Zerewitinoff method, water, and a polyfunctional isocyanate comprising a gel catalyst selected from the group consisting of $Sn(OCOR)_2$ and $R'_a SnX_b$ wherein R and R' are independently selected from the group consisting of alkyl, alkenyl, aryl, aralkyl, alkaryl, and cycloalkyl, $a$ and $b$ are integers the sum of which is 4 and X is selected from the group consisting of chlorides and the negative residual portions of organic carboxylic acids, mercaptides, alcohols, esters of mercaptoacids, and as a blowing catalyst combination 40 percent to 60 percent, by weight, of an antimony carboxylate and 60 percent to 40 percent, by weight, of a sodium or potassium salt of a nitrogen-containing organic compound selected from the group consisting of primary, secondary, and tertiary amino-substituted carboxylic acids, aromatic amino-substituted carboxylic acids, monoamino-mono-carboxylic acids, monoamino-dicarboxylic acids, diamino-mono-carboxylic acids, heterocyclic aminoacids, amidoximes, and hydroamic acids, said gel catalyst and blowing catalyst combination being present in the ratio of 0.01 parts to 5 parts of the former per part of the latter.

10. The novel composition of claim 9 wherein said gel catalyst is stannous 2ethylhexanoate and said antimony carboxylate is antimony tritallate.

11. A novel catalytic composition suitable for use as a blowing and gel catalyst in the production of polyurethane foams by the reaction of a substance having active hydrogen atoms as determined by the Zerewitinoff method, and organic polyfunctional isocyanate and water, which comprises a stannous octoate gel catalyst and as a blowing catalyst combination 40 percent to 60 percent, by weight, of an antimony carboxylate and 60 percent to 40 percent, by weight, of a sodium or potassium salt of a nitrogen-containing organic compound selected from the group consisting of primary, secondary, and tertiary amino-substituted carboxylic acids, aromatic amino-substituted carboxylic acids, monoamino-mono-carboxylic acids, monoamino-dicarboxylic acids, diamino-mono-carboxylic acids, heterocyclic aminoacids, amidoximes, and hydroxamic acids, said gel catalyst and blowing catalyst combination being present in the ratio of 0.01 to 5 parts of the former per part of the latter.

* * * * *

UNITED STATES PATENT OFFICE
CERTIFICATE OF CORRECTION

Patent No.  3,620,985          Dated  11/16/71

Inventor(s)  William A. Larkin and Kenneth Treadwell

It is certified that error appears in the above-identified patent and that said Letters Patent are hereby corrected as shown below:

Column 2, lines 5-11, the subscript " n'7E'a"

should read --n-a--.

Column 12, line 52, insert --}-- following

"captoacetate".

Signed and sealed this 30th day of May 1972.

(SEAL)
Attest:

EDWARD M. FLETCHER, JR.
Attesting Officer

ROBERT GOTTSCHALK
Commissioner of Patents